(12) United States Patent
Lin et al.

(10) Patent No.: US 11,360,345 B1
(45) Date of Patent: Jun. 14, 2022

(54) DISPLAY PANEL AND DISPLAY DEVICE

(71) Applicant: JRD COMMUNICATION (SHENZHEN) LTD., Shenzhen (CN)

(72) Inventors: Ke Lin, Shenzhen (CN); Zhuwei Qiu, Shenzhen (CN); Jitao Ma, Shenzhen (CN); Ping Chen, Shenzhen (CN)

(73) Assignee: JRD COMMUNICATION (SHENZHEN) LTD, Shenzhen (CN)

( * ) Notice: Subject to any disclaimer, the term of this patent is extended or adjusted under 35 U.S.C. 154(b) by 0 days.

(21) Appl. No.: 17/203,784

(22) Filed: Mar. 17, 2021

(30) Foreign Application Priority Data

Feb. 9, 2021 (CN) .......................... 202110181188.4

(51) Int. Cl.
*G02F 1/1335* (2006.01)
*G02F 1/1368* (2006.01)

(52) U.S. Cl.
CPC .. *G02F 1/133524* (2013.01); *G02F 1/133504* (2013.01); *G02F 1/133553* (2013.01); *G02F 1/1368* (2013.01); *G02F 2203/02* (2013.01)

(58) Field of Classification Search
CPC .................................................. G02F 1/133524
See application file for complete search history.

(56) References Cited

U.S. PATENT DOCUMENTS

| | | | |
|---|---|---|---|
| 4,519,678 A | 5/1985 | Komatsubara et al. | |
| 6,219,119 B1 | 4/2001 | Nakai | |
| 2003/0043320 A1 | 3/2003 | Suzuki et al. | |
| 2007/0008464 A1 | 1/2007 | Yamaguchi | |
| 2014/0027727 A1* | 1/2014 | Lee | H01L 51/5281 257/40 |
| 2017/0285401 A1* | 10/2017 | Cui | G02F 1/133553 |
| 2020/0209678 A1 | 7/2020 | Hsu et al. | |

FOREIGN PATENT DOCUMENTS

| | | |
|---|---|---|
| CN | 1366202 A | 8/2002 |
| CN | 1521539 A | 8/2004 |
| CN | 101916006 A | 12/2010 |
| EP | 1039333 A1 | 9/2000 |
| EP | 1914588 A2 | 4/2008 |
| WO | WO0020920 A1 | 4/2000 |

OTHER PUBLICATIONS

European search report, European Application No. 21162646.0, dated Aug. 23, 2021(7 pages).
Chinese First office action, Chinese Application No. 202110181188.4, dated Mar. 10, 2022(11 pages).

* cited by examiner

*Primary Examiner* — Edmond C Lau

(57) ABSTRACT

The present disclosure provides a display panel and a display device. The display panel includes a thin film transistor layer; a reflective layer, disposed on the thin film transistor layer; a color film layer, disposed opposite to the reflective layer and having a light incident surface and a light emitting surface; a liquid crystal layer, disposed between the reflective layer and the color film layer; and at least one light guide structure, disposed on a surface of the reflective layer towards the liquid crystal layer. The at least one light guide structure is capable of adjusting a reflection angle of light incident from the light incident surface and reflecting the reflected light to the light emitting surface.

16 Claims, 3 Drawing Sheets

DISPLAY PANEL AND DISPLAY DEVICE

CROSS REFERENCE

The present application claims priority of Chinese Patent Application No. 202110181188.4, filed on Feb. 9, 2021, in the National Intellectual Property Administration of China, the entire contents of which are hereby incorporated by reference in its entirety.

TECHNICAL FIELD

The present disclosure relates to the field of display technologies, and in particular to a display panel and a display device.

BACKGROUND

With the gradual expansion of the use of electronic products, people are increasingly concerned about whether the screen of the electronic product causes damage to the eyes. A newly introduced reflective display technology may be applied into the electronic product. In the reflective display technology, the ambient light reflects off an inside of the display screen, thereby causing the display screen to display. Compared with the LED lights of conventional displays, this technology has less impact on the eyes.

The light-emitting principle of the reflective display is that: a reflective layer is coated inside the display screen, and a luminous effect is achieved through the absorption and reflection of external natural light. The reflective layer is generally made of metal material. When the light irradiates the metal material, most of the light will form a mirror reflection. Therefore, the light is highly directional and affects the display effect.

SUMMARY OF THE DISCLOSURE

The present disclosure provides a display panel and a display device.

The display panel, includes: a thin film transistor layer; a reflective layer, disposed on the thin film transistor layer; a color film layer, disposed opposite to the reflective layer and having a light incident surface and a light emitting surface; a liquid crystal layer, disposed between the reflective layer and the color film layer; and at least one light guide structure, disposed on a surface of the reflective layer towards the liquid crystal layer. The at least one light guide structure is capable of adjusting a reflection angle of light incident from the light incident surface and reflecting the reflected light to the light emitting surface.

BRIEF DESCRIPTION OF THE DRAWINGS

The technical solutions and other beneficial effects of the present disclosure will be apparent by the following detailed description of the specific embodiments of the present disclosure in conjunction with the accompanying drawings.

DETAILED DESCRIPTION

Figure 1:
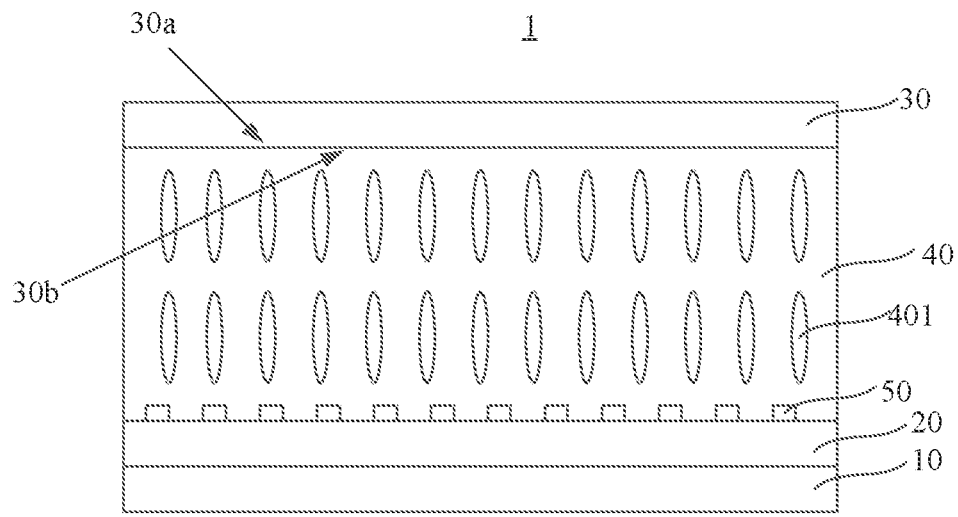
FIG. 1 is a structural schematic view of a display panel according to a first embodiment of the present disclosure.

The technical solutions in the embodiments of the present disclosure will be clearly and completely described below in conjunction with the accompanying drawings in the embodiments of the present disclosure. Obviously, the described embodiments are only a part of the embodiments of the present disclosure, and not all of them. Based on the embodiments in the present disclosure, all other embodiments obtained by a person skilled in the art without making creative labor fall within the scope of the present disclosure.

In the description of the present disclosure, it is to be understood that the terms "center", "longitudinal", "transverse", "length", "width", "thickness", "front", "back", "left", "right". "vertical", "horizontal", "top". "bottom", "inside", "outside", "clockwise", "counterclockwise" and other indicated orientation or positional relationships are orientation or positional relationships shown in the accompanying drawings and are intended only to facilitate and simplify the description of the present disclosure, but not to indicate or imply that the device or element referred to must have a particular orientation, be constructed and operated in a particular orientation. Therefore, the terms cannot be construed as a limitation of the present disclosure. Furthermore, the terms "first" and "second" are for descriptive purposes only and are not to be construed as indicating or implying relative importance or implicitly specifying the number of technical features indicated. Thus, the features defined with "first" and "second" may explicitly or implicitly include one or more of the described features. In the description of the present disclosure, "plurality" means two or more, unless otherwise expressly and specifically limited.

In the description of the present disclosure, it is noted that, unless otherwise expressly specified and limited, the terms "mounted", "connected", etc. are to be understood in a broad sense. For example, they can be a fixed connection, a removable connection, or an integral connection; they can be a mechanical connection, or an electrical connection or can communicate with each other; they can be a direct connection, or an indirect connection through an intermediate medium; and they can be a connection within two components or an interactive relationship between two components. To a person skilled in the art, the specific meaning of the above terms in the present disclosure can be understood on a case-by-case basis.

In the present disclosure, unless otherwise expressly specified and limited, a first feature "on" or "under" a second feature may include direct contact between the first and second features, or may include indirect contact between the first and second features through another feature between them. Also, the first feature being "on", "above" and "on the top of" the second feature includes the first feature being directly above and diagonally above the second feature, or simply indicates that the first feature is horizontally higher than the second feature. The first feature being "below". "under" and "on the bottom of" the second feature includes the first feature being directly below and diagonally below the second feature, or simply indicates that the first feature is horizontally lower the second feature.

The following disclosure provides a number of different embodiments or examples for implementing the different structures of the present disclosure. To simplify the disclosure of the present disclosure, the components and configurations of particular examples are described below. They are, of course, examples only and are not intended to limit the present disclosure. Furthermore, the present disclosure may repeat reference numbers and/or reference letters in different examples, such repetition being for the purpose of simplicity and clarity and not in itself indicative of a relationship between the various embodiments and/or configurations discussed. In addition, the present disclosure provides examples of various specific processes and materials, but a person skilled in the art may be aware of other applications of processes and/or the use of other materials.

Specifically, referring to FIG. 1, an embodiment of the present disclosure provides a display panel 1 including a thin film transistor layer 10, a reflective layer 20, a color film layer 30, a liquid crystal layer 40, and a light guide structure 50. The reflective layer 20 is disposed on the thin film transistor layer 10. The color film layer 30 is disposed opposite to the reflective layer 20. The color film layer 30 has a light incident surface 30a and a light emitting surface 30b. The liquid crystal layer 40 is disposed between the reflective layer 20 and the color film layer 30. The light guide structure 50 is disposed on a surface of the reflective layer 20 towards the liquid crystal layer 40. The light guide structure 50 is capable of adjusting a reflection angle of the light incident from the light incident surface 30a and reflecting the reflected light to the light emitting surface 30b. In this way, a problem of mirror reflection after the light is directed into the display panel may be solved, improving the display effect.

It should be noted that the mirror reflection refers to the reflection of a reflected wave (electromagnetic wave, sound wave, or water wave) with a definite direction. An angle (reflection angle) between the direction of the reflected wave and the normal to the plane of reflection, and an angle (incident angle between) the direction of the incident wave and the normal to the plane of reflection are the same. The incident wave, the reflected wave, and the normal to the plane of reflection are in a same plane. A reflection corresponding to the mirror reflection is diffuse reflection. The diffuse reflection is a phenomenon in which the light projected on a rough surface is reflected in all directions. When a parallel beam of incident light is shot to the rough surface, the surface will reflect the light in all directions. Therefore, although the beams of incident light are parallel to each other, due to the normal direction of each point is not the same, the reflected light reflects irregularly in different directions. This reflection is called "diffuse reflection" or "diffuse radiation". This reflected light is called diffuse light. Many objects, such as plants, walls, clothing, etc., the surface thereof seems to be smooth, but with a magnifying glass to look closely, the surface will be seen to be uneven. Therefore, the originally parallel sunlight is reflected by these surfaces and is diffusely directed in different directions. Each light of diffuse reflection follows the law of reflection. Parallel light beams are no longer parallel after diffuse reflection. The brightness of the object formed by diffuse reflection generally depends on the intensity of the light source and the nature of the reflecting surface.

Specifically, the thin film transistor layer 10 may include an array substrate and a pixel cell arranged on the array substrate. The pixel cell may include a thin film transistor (TFT), a pixel electrode, and a common electrode. The material of the pixel electrode may be indium tin oxide. The thin film transistor may be a polycrystalline silicon thin film transistor or an amorphous oxide semiconductor thin film transistor, which may be selected according to actual situations. Further, the polycrystalline silicon thin film transistor may be a low temperature poly-silicon thin film transistor (LIPS TFT). The amorphous oxide semiconductor thin film transistor may be an indium crop zinc oxide thin film transistor. The amorphous oxide semiconductor thin film transistor may effectively improve the charge mobility and reduce parasitic capacitance. The polycrystalline silicon thin film may have a small leakage current and be driven at low frequency. In some embodiments, the two may be alternately arranged on the array substrate, which may simultaneously achieve high frequency driving and reduce the power consumption of the array substrate.

Figure 2:
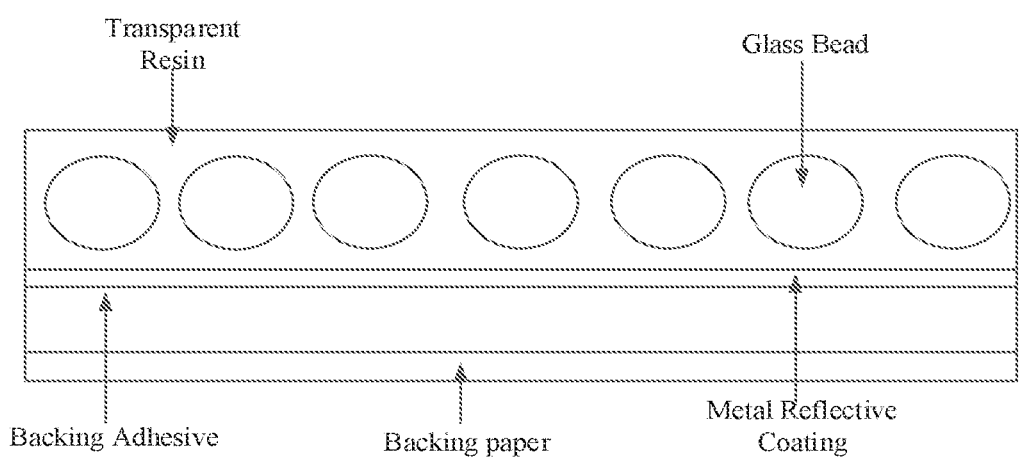
FIG. 2 is a structural schematic view of a glass bead reflective film.

In order to achieve the ability to display in ambient light, the reflective layer may be made of reflective materials, or may be a composite mechanism. For example, the reflective layer 20 includes a metal base layer and a fully reflective film arranged on the metal base layer. According to the structure of the reflective unit of the reflective film, the reflective film may be divided into two major categories, a glass bead type reflective film and a micro-prismatic type reflective film. Each category contains many types of reflective film. The micro-prismatic reflective film, which has many variations in material selection and prism structure due to more advanced technological processes, may cope with more traffic needs. According to the prism form and technical characteristics, the micro-prismatic reflective film may be divided into a truncated prismatic reflective film with good retro-reflectivity at long distances, a truncated prismatic reflective film with good retro-reflectivity at large angles at close distances, a full prismatic reflective film that takes into account the needs of all aspects, a fluorescent full prismatic reflective film with good performance in both daytime and adverse weather conditions, a prismatic reflective film that meets traditional engineering grade retro-reflective parameters, etc. Referring to FIG. 2, the reflective film is a layer structure including multiple layers of different performance materials. Different reflective films include different layer structures. FIG. 2 is a structural schematic view of the earliest appearing glass bead reflective film. It can be seen that the reflective film is generally a film structure object including multiple layers of different substances such as surface layer (protective film), reflective layer (functional layer), base layer (bearing layer), adhesive layer and bottom layer (protective layer). The surface layer of the reflective film is generally made of resin film with good light transmission and weather resistance. The reflective layer is made of different materials according to different types of reflective film, such as tiny glass beads, micro prism or metal reflective coating, etc. The base layer is mostly made of resin organic compounds. The adhesive layer is generally epoxy resin adhesive. The bottom layer is a protective layer generally made of thick paper.

When the natural light passes through the light incident surface 30a of the color film layer 30 to the reflective layer 20, the reflective layer 20 reflects the light, and the light emits from the light emitting surface 30b of the color film layer 30 for image display. In some embodiments, a reflective sheet may be arranged on a surface of the thin film transistor layer 10 away from the reflective layer 20 to prevent light from being emitted from the surface of the thin film transistor layer 10 away from the reflective layer 20 and to improve light utilization.

The color film layer 30 is also known as a color filter, which is a kind of optical filter that expresses color. The color filter can precisely select a small range of light waves required to pass through, and reflect off other undesired waves. The color filter is usually arranged in front of the light source, such that the human eye may receive saturated light of a certain color. The color filter includes infrared filter, green filter, blue filter, etc.

The color filter is a key component for colorization of a liquid crystal display (LCD). As a non-active light-emitting component, the color of the LCD must be provided by an internal backlight module (see-through LCD) or an external ambient incident light (reflective or semi-sec-through LCD) for displaying, controlled by a drive IC and liquid crystals to form a gray scale display, and filtered by a red (R), green (G), and blue (B) color layers of the color filter to provide chromacity, in this way, the color display screen is formed. The color filter manufacturing methods include dyeing, pigment dispersion, printing, electroplating, ink jetting, etc. The pigment dispersion method has the advantages in color characteristics, quality, and visualization, so it has become a mainstream production method of color filters. The color filter manufacturing process of the pigment dispersion method includes black matrix project, RGB project, post project, and shipping project. The black matrix project is to form a low-reflective chromium oxide/chromium two-layer film on an alkali-free boron glass substrate by sputtering to prepare a substrate. The low-reflective two-layer film is called metal black. Then the positive photoresist on the side of the metal black is coated by spinning. Through a photomask, the black matrix pattern is irradiated with ultraviolet light and exposed, and the photoresist is developed. Thereafter the metal black is etched to form a black matrix pattern. Then the RGB project is followed, which is a process of forming R, G, and B color patterns at an opening. First, a colored photoresist colored with R is painted by spinning, and irradiated with ultraviolet light and exposed through a patterned photomask for R. The unexposed part is removed by an alkaline developer to form an R pattern for a first color, and then post coating is applied at 200° C. to make the pattern resistant to chemicals. Then the same process of forming the R pattern is repeated on G pattern and R pattern. Each pattern is separated by the black matrix to increase the contrast of the display and to avoid stray light. In the post project, an indium tin oxide (ITO) transparent electrode layer of relative electrodes of the TFT array substrate is formed, that is, the color filter is formed. Finally, the shipping project is the final inspection and bundling. In the color filter manufacturing process, a key to pay attention to is segment difference between the three RGB colors. The segment difference may affect the liquid crystal performance. When the segment difference is too large, a fault may be generated. In addition, the RGB project is a process at high temperature, so the raw materials shall have chemical resistance and not decline. The black matrix is mainly for isolation of the RGB colors and is the key to improve color contrast. The black matrix is generally required with low reflection. The lower the reflection, the better the color performance will be.

The color film layer 30 includes a color film substrate, a color barrier, a shading block and an orientation layer disposed on the color film substrate. The color film substrate may be a glass substrate. The material of the shading block may be a black resin material. The shading block may be configured to define sub-pixel areas and to prevent light leakage from the display panel. The material of the orientation layer may be polyimide. In an actual production process, an alignment solution may be applied to the color film substrate and cured for anchoring the liquid crystal molecules. Then, a pre-tilt angle may be formed by applying electricity such that the liquid crystal molecules may be arranged in an orderly manner.

The liquid crystals may be classified as thermotropic liquid crystals and lyotropic liquid crystals. The thermotropic liquid crystals are liquid crystals formed from a single compound or from a homogeneous mixture of a few compounds. The liquid crystal phase appears usually only at a certain temperature range. The molecular weight of a typical long rod-shaped thermotropic liquid crystal is usually around 200-500 g/mol. The lyotropic liquid crystals are liquid crystals formed by two or more compounds including solvent compounds. The liquid crystal phase appears when the concentration of solute molecules in the solution is in a certain range. The solvent of the lyotropic liquid crystals is mainly water or other polar molecular liquids. The main reason for long-range ordering of molecules in the lyotropic liquid crystals is the interaction between solute and solvent molecules, while the interaction between solute molecules is of secondary importance.

The liquid crystal layer 40 may include a plurality of liquid crystal molecules 401, which are liquid crystal materials having a property of deflecting orientation in a particular direction by applying a driving voltage. A threshold value of the driving voltage applied to achieve different deflection orientations. A reactive monomer is a polymeric monomer, which includes one or more of an acrylate resin monomer molecule, a methacrylate resin monomer molecule, a vinyl resin monomer molecule, an ethenoxy resin monomer molecule, and an epoxy resin monomer molecule. The reactive monomer is configured to form a polymer on the surface of the substrate by an ultraviolet light process when the driving voltage is applied to adjust the orientation of the liquid crystal molecules 401. When the voltage application is removed, the liquid crystal layer 40 with a defined pointing direction and pre-tilt angle can be formed. The liquid crystal molecules 401 may also be made to have a certain pre-tilt angle with respect to the thin film transistor layer 10 and the color film layer 30 by an ordinary frictional alignment process, which actually makes the liquid crystal molecules 401 have a certain pre-tilt angle with respect to the array substrate and the color film substrate.

The light guide structure 50 provided in the present disclosure may be disposed on the surface of the reflective layer 20 towards the liquid crystal layer 40, as shown in FIG. 1. The light guide structure 50 is configured to adjust the reflection angle of the light incident from the light incident surface 30a and reflect the reflected light to the light emitting surface 30b. In this way, a diffuse reflection on the surface of the reflective layer 20 may be formed, a problem of mirror reflection after the light is directed into the display panel may be solved, improving the display effect.

Figure 3:
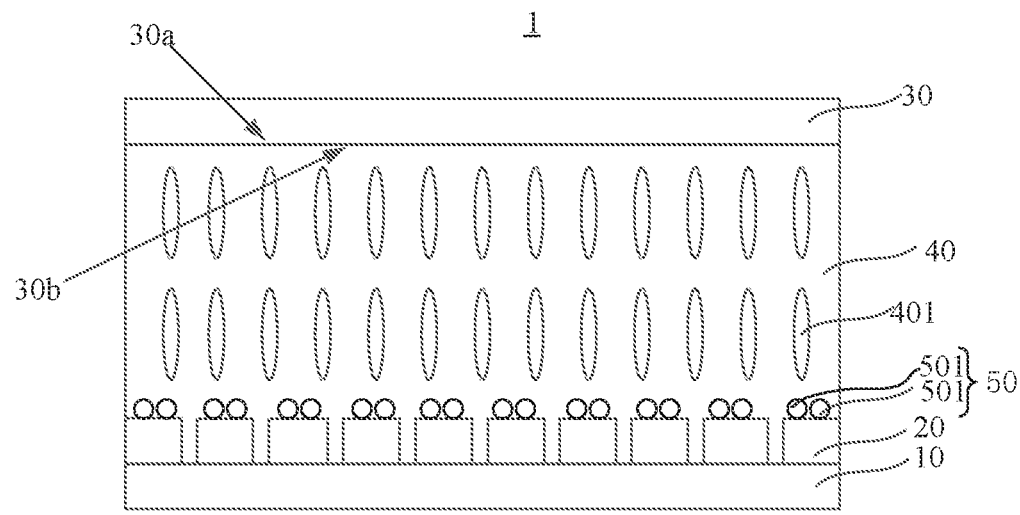
FIG. 3 is a structural schematic view of a display panel according to a second embodiment of the present disclosure.

Further, referring to FIG. 3, the present disclosure also provides a display panel 1, which differs from the display panel 1 of FIG. 1 in that the light guide structure 50 includes a plurality of light guide portions 501 disposed on the surface of the reflective layer 20 towards the liquid crystal layer 40. Each light guide portion 501 is configured to adjust the reflection angle of the light incident from the light incident surface 30a and reflect the reflected light to the light emitting surface 30b.

Specifically, when the natural light passes through the light incident surface 30a of the color film layer 30 to the reflective layer 20, each light guide portion 501 may adjust the incident light such that the incident light may be reflected by the reflective layer 20 with different angles. In this way, a diffuse reflection on the surface of the reflective layer 20 may be formed, a problem of mirror reflection after the light is directed into the display panel may be solved, improving the display effect.

It can be understood that the structure of the reflective layer 20 provided by the present disclosure may be a whole reflective structure or a reflective layer including a plurality of reflective blocks. In some embodiments, as shown in FIG. 4, the present disclosure also provides a display panel 1, which differs from the display panel 1 of FIG. 1 in that the reflective layer 20 includes a plurality of reflective blocks 201 arranged at intervals, and the light guide structure 50 includes a plurality of first light guide portions 501a and a plurality of second light guide portions 501b.

Each reflective block 201 is arranged with a plurality of first light guide portions 501a. A plurality of second light guide portions 501b are arranged between adjacent reflective blocks 201.

Figure 4:
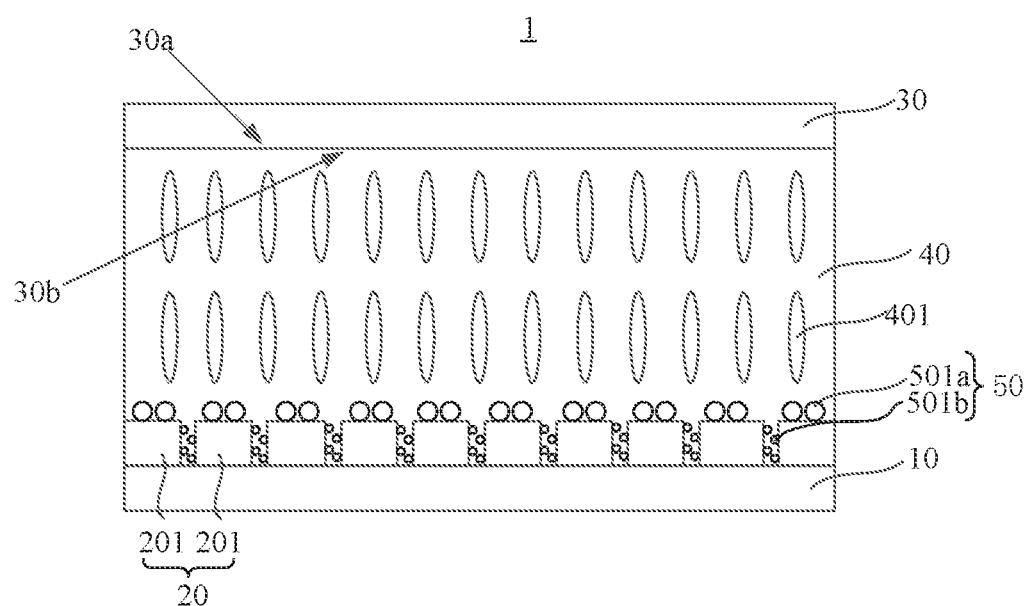
FIG. 4 is a structural schematic view of a display panel according to a third embodiment of the present disclosure.

Taking two adjacent reflective blocks 201 as an example, a plurality of first light guide portions 501a are arranged on each reflective block 201, and a plurality of second light guide portions 501b are arranged on a side of the reflective block 201 facing an adjacent reflective block 201, as shown in FIG. 4. In this way, both the first light guide portions 501a and the second light guide portions 501b can adjust the incident light such that the incident light may be reflected by the reflective layer 20 with different angles. In this way, a diffuse reflection on the surface of the reflective layer 20 may be formed, a problem of mirror reflection after the light is directed into the display panel may be solved, improving the display effect.

Figure 5:
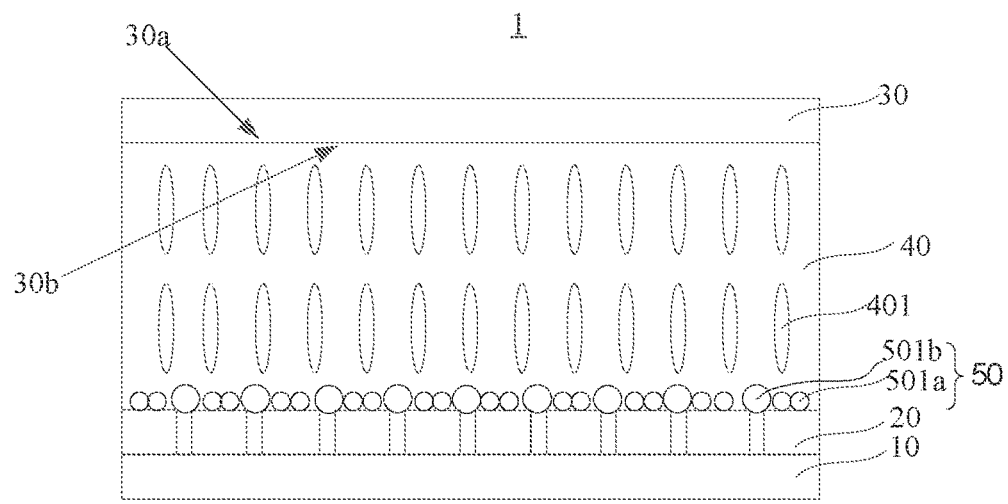
FIG. 5 is a structural schematic view of a display panel according to a fourth embodiment of the present disclosure.

In some embodiments, each second light guide portion 501b may be disposed at an interval between adjacent reflective blocks 201, as shown in FIG. 5. At least one second light guide portion 501b is disposed at each interval between adjacent reflective blocks 201. It is to be understood that in this embodiment, the size of the second light guide portion 501b is greater than the size of the interval between adjacent reflective blocks 201. When the second light guide portion 501b is a sphere, then the diameter thereof is greater than the length of the interval between the reflective blocks 201. When the second light guide portion 501b is a rectangular body, then the length, width and/or height thereof is greater than the length of the interval between the reflective blocks 201, depending on actual situations.

It should be noted that when the second light guide portion 501b is a rectangular body, in order to avoid that the light directed at the surface of the second light guide portion 501b emits with a same angle, the surface of the second light guide portion 501b may be arranged with a roughened structure. In this way, the reflection angle of the light directed at the second light guide portion 501b may be adjusted such that the light directed at the second light guide portion 501b forms a diffuse reflection on the surface of the second light guide portion 501b, thereby improving the display effect.

It is to be understood that the light guide portion 501 (or the first light guide portion 501a and the second light guide portion 501b) in the present disclosure may be a sphere or a hemisphere, depending on actual situations. For example, the first light guide portion 501a is a sphere and the second light guide portion 501b is a hemisphere. Or, the first light guide portion 501a is a hemisphere and the second light guide portion 501b is a sphere.

Figure 6:
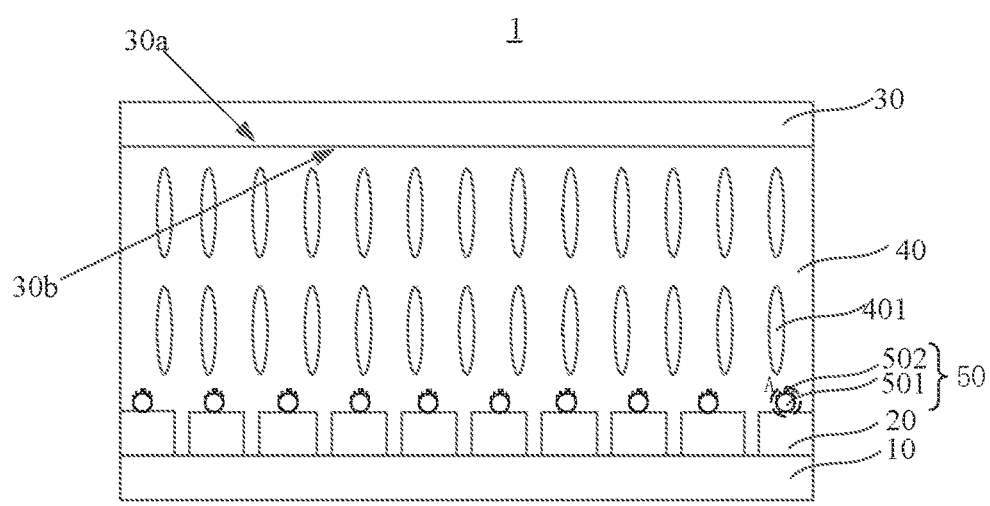
FIG. 6 is a structural schematic view of a display panel according to a fifth embodiment of the present disclosure.

Further, in order to avoid the light directed at the light guide portion 501 from forming the mirror reflection on the surface of the light guide portion 501, resulting in a poor display effect of the display panel 1, the present disclosure also provides a display panel 3 as shown in FIG. 6, which differs from the display panel 1 of FIG. 1 in that the surface of the light guide portion 501 is further arranged with a plurality of protrusions 502 distributed on the surface of the light guide portion 501 towards the liquid crystal layer 40. It can be understood that the surface of the first light guide portion 501a and/or the second light guide portion 501b may be also arranged with the protrusions 502. Further, it can be understood that the first light guide portion 501a and/or the second light guide portion 501b may have a same structure and/or be made of a same material as the light guide portion 501.

Specifically, the shape of the protrusions 502 may be triangular, circular, curved and/or irregular, etc., depending on actual situations. For example, the shape of the protrusions 502 on one light guide portion 501 are all configured as triangular, and the shape of the protrusions 502 on another light guide portion 501 are all configured as curved. Or, the shape of the protrusions 502 on one light guide portion 501 are all configured as circular, and the shape of the protrusions 502 on another light guide portion 501 are all configured as curved. Or, the shape of the protrusions 502 on one light guide portion 501 are configured as triangle, circle, arc and irregular shape respectively, and the shape of the protrusions 502 on another light guide portion 501 are configured as triangle and circle, which may be arranged according to actual needs. The embodiment is described by way of example only, and is not a limitation of the present disclosure.

Figure 7:
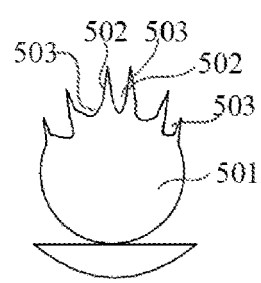
FIG. 7 is a partially enlarged view of area A in the display panel shown in FIG. 6.

In some embodiments, as shown in FIG. 6 and FIG. 7, the present disclosure also provides a display panel 1, which differs from the display panel 1 of FIG. 6 in that the light guide portion 501 is arranged with a recessed portion 503 between adjacent protrusions 502.

In order to further avoid the light directed at the light guide portion 501 from forming the mirror reflection on the surface of the light guide portion 501, resulting in a poor display effect of the display panel 1, the protrusions 502 are arranged on the surface of the light guide portion 501, while the recessed portion 503 is also arranged on the surface of the light guide portion 501. Specifically, a plurality of recessed portions 503 may be arranged between adjacent protrusions 502, or one recessed portion 503 may be arranged between adjacent protrusions 502, depending on the spacing between adjacent protrusions 502.

For example, 10 recessed portions 503 are arranged between one set of adjacent protrusions 502, and 1 recessed portion 503 is arranged between another set of adjacent protrusions 502. The depth of each recessed portion 503 may be equal or unequal, or the depth of some of the recessed portions 503 may be equal. The cross-section shape of the recessed portion 503 may be triangular, circular, curved, and/or irregular, etc., depending on actual situations.

Thus, when light is directed into the display panel 1, the light guide portion 501 (or the first light guide portion 501a and the second light guide portion 501b), the protrusions 502, and the recessed portion 503 may be arranged to eliminate the mirror reflection formed after the light is directed into the display panel 1. In this way, the problem of s the mirror reflection formed after the light is directed into the display panel 1 may be solved, and thus the display effect can be improved.

In the above embodiments, the description of each embodiment has its own focus, and the parts that are not described in detail in a certain embodiment can be found in the relevant descriptions of other embodiments.

The above embodiments of the present disclosure provide a detailed description of an electronic device. The specification applies specific examples of the principles and implementation of the present disclosure. The above embodiments of the description is only to help understand the technical solutions of the present disclosure and core ideas thereof. A person skilled in the art should understand that the technical solutions recorded in the foregoing embodiments may be modified, or equivalent replacement of some of the technical features may be made. The modifications or replacements do not make the essence of the corresponding technical solutions out of the scope of the technical solutions of the embodiments of the present disclosure.

What is claimed is:

1. A display panel, comprising:
 a thin film transistor layer;
 a reflective layer, disposed on the thin film transistor layer;
 a color film layer, disposed opposite to the reflective layer and having a light incident surface and a light emitting surface;
 a liquid crystal layer, disposed between the reflective layer and the color film layer; and
 at least one light guide structure, disposed on a surface of the reflective layer towards the liquid crystal layer;
 wherein the at least one light guide structure is capable of adjusting a reflection angle of light incident from the light incident surface and reflecting the reflected light to the light emitting surface;
 wherein the at least one light guide structure comprises a plurality of light guide portions disposed on the surface of the reflective layer towards the liquid crystal layer; the reflective layer comprises a plurality of reflective blocks arranged at intervals, and at least one of the plurality of light guide portions is disposed on a surface of each of the plurality of reflective blocks towards the liquid crystal layer.

2. The display panel according to claim 1, wherein the shape of each of the plurality of light guide portions is a sphere.

3. The display panel according to claim 1, wherein the shape of each of the plurality of light guide portions is a hemisphere.

4. The display panel according to claim 1, wherein a plurality of protrusions are distributed on a surface of each of the plurality of light guide portions towards the liquid crystal layer.

5. The display panel according to claim 4, wherein the shape of each of the plurality of protrusions is a hemisphere, and a curvature of each of the plurality of protrusions is different.

6. The display panel according to claim 4, wherein a recessed portion is arranged between adjacent two of the plurality of protrusions.

7. The display panel according to claim 1, wherein the reflective layer comprises a plurality of reflective blocks arranged at intervals, and the at least one light guide structure comprises a plurality of first light guide portions and a plurality of second light guide portions;
 at least one of the plurality of first light guide portions is disposed on each of the plurality of reflective blocks; at least one of the plurality of second light guide portions is disposed between adjacent two of the plurality of reflective blocks.

8. The display panel according to claim 7, wherein the at least one of the plurality of second light guide portions is received in an interval between two adjacent two of the plurality of reflective blocks.

9. The display panel according to claim 7, wherein the size of each of the plurality of second light guide portions is greater than the size of an interval between the adjacent two of the plurality of reflective blocks.

10. The display panel according to claim 7, wherein a plurality of protrusions are distributed on a surface of each of the plurality of first light guide portions and/or the plurality of second light guide portions towards the liquid crystal layer.

11. The display panel according to claim 10, wherein the shape of each of the plurality of protrusions is a hemisphere, and a curvature of each of the plurality of protrusions is different.

12. The display panel according to claim 10, wherein a recessed portion is arranged between adjacent two of the plurality of protrusions.

13. The display panel according to claim 7, wherein the shape of each of the plurality of first light guide portions is a sphere or a hemisphere.

14. The display panel according to claim 7, wherein the shape of each of the plurality of second light guide portions is a sphere or a hemisphere.

15. A display device, comprising a display panel comprising:
 a thin film transistor layer;
 a reflective layer, disposed on the thin film transistor layer;
 a color film layer, disposed opposite to the reflective layer and having a light incident surface and a light emitting surface;
 a liquid crystal layer, disposed between the reflective layer and the color film layer; and
 at least one light guide structure, disposed on a surface of the reflective layer towards the liquid crystal layer;
 wherein the at least one light guide structure is capable of adjusting a reflection angle of light incident from the light incident surface and reflecting the reflected light to the light emitting surface;
 wherein the at least one light guide structure comprises a plurality of light guide portions disposed on the surface of the reflective layer towards the liquid crystal layer; the reflective layer comprises a plurality of reflective blocks arranged at intervals, and at least one of the plurality of light guide portions is disposed on a surface of each of the plurality of reflective blocks towards the liquid crystal layer.

16. The display device according to claim 15, wherein the reflective layer comprises a plurality of reflective blocks arranged at intervals, and the at least one light guide structure comprises a plurality of first light guide portions and a plurality of second light guide portions;
 at least one of the plurality of first light guide portions is disposed on each of the plurality of reflective blocks; at least one of the plurality of second light guide portions is disposed between adjacent two of the plurality of reflective blocks.

* * * * *